(12) United States Patent
Searfoss

(10) Patent No.: US 10,935,069 B2
(45) Date of Patent: Mar. 2, 2021

(54) DRIVE SHAFT ASSEMBLY

(71) Applicant: Aero Industries, Inc., Indianapolis, IN (US)

(72) Inventor: Timothy K. Searfoss, West Branch, MI (US)

(73) Assignee: Aero Industries, Inc., Indianapolis, IN (US)

( * ) Notice: Subject to any disclaimer, the term of this patent is extended or adjusted under 35 U.S.C. 154(b) by 366 days.

(21) Appl. No.: 15/951,613

(22) Filed: Apr. 12, 2018

(65) Prior Publication Data

US 2018/0298939 A1    Oct. 18, 2018

Related U.S. Application Data

(60) Provisional application No. 62/485,101, filed on Apr. 13, 2017.

(51) Int. Cl.
*F16C 3/03* (2006.01)
*F16D 3/06* (2006.01)

(52) U.S. Cl.
CPC .......... *F16C 3/03* (2013.01); *F16D 3/06* (2013.01); *F16C 2326/06* (2013.01); *Y10T 403/32106* (2015.01); *Y10T 403/32188* (2015.01); *Y10T 403/32967* (2015.01)

(58) Field of Classification Search
CPC .......... F16C 3/03; F16C 2326/06; F16D 3/06; Y10T 403/32967; Y10T 403/32106; Y10T 403/32188
USPC .......................................... 464/112–114, 162
See application file for complete search history.

(56) References Cited

U.S. PATENT DOCUMENTS

| | | | | |
|---|---|---|---|---|
| 73,914 A | * | 6/1868 | Moul | ............................ 464/162 |
| 636,758 A | * | 11/1899 | Casaday | ........................ 464/114 |
| 5,360,377 A | * | 11/1994 | Fernandez | ................ F16C 1/04 |
| | | | | 464/162 |

\* cited by examiner

*Primary Examiner* — Greg Binda
(74) *Attorney, Agent, or Firm* — Maginot, Moore & Beck, LLP

(57) ABSTRACT

A system includes a pair of gearboxes each having an output shaft. A first adapter is connected to the output shaft of the first gearbox, and a second adapter is connected to the output shaft of the second gearbox. A first drive shaft is connected to the first adapter, and a second drive shaft is connected to the second adapter. Each drive shaft may articulate with respect to an axis defined by its associated output shaft through an angle of at least twenty degrees.

15 Claims, 14 Drawing Sheets

DRIVE SHAFT ASSEMBLY

CROSS-REFERENCE TO RELATED APPLICATION

This application claims priority to U.S. Provisional Patent Application No. 62/485,101, entitled "Drive Shaft Assembly," filed on Apr. 13, 2017, the disclosure of which is hereby expressly incorporated by reference in its entirety.

FIELD OF THE DISCLOSURE

The present disclosure generally relates to drive shaft assemblies.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
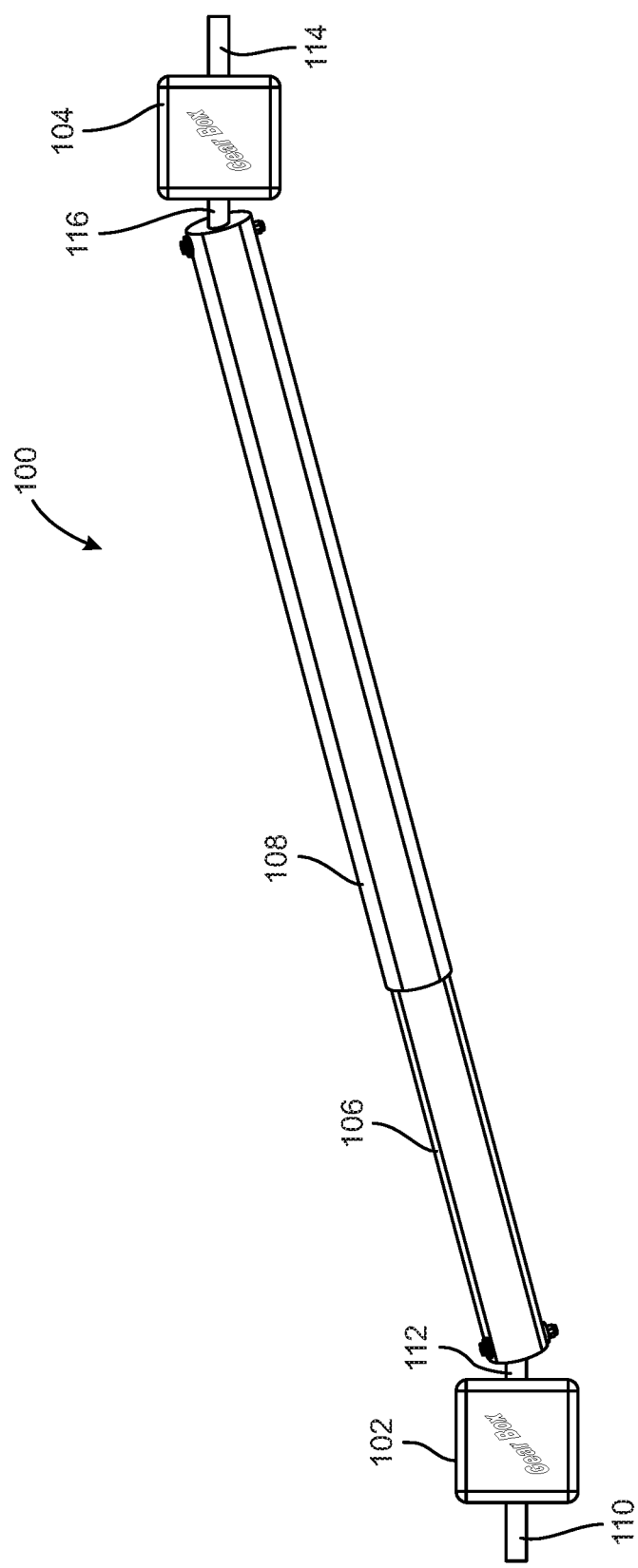
FIG. 1 is a front view of a drive shaft assembly, according to one embodiment of the present disclosure.
Figure 2:
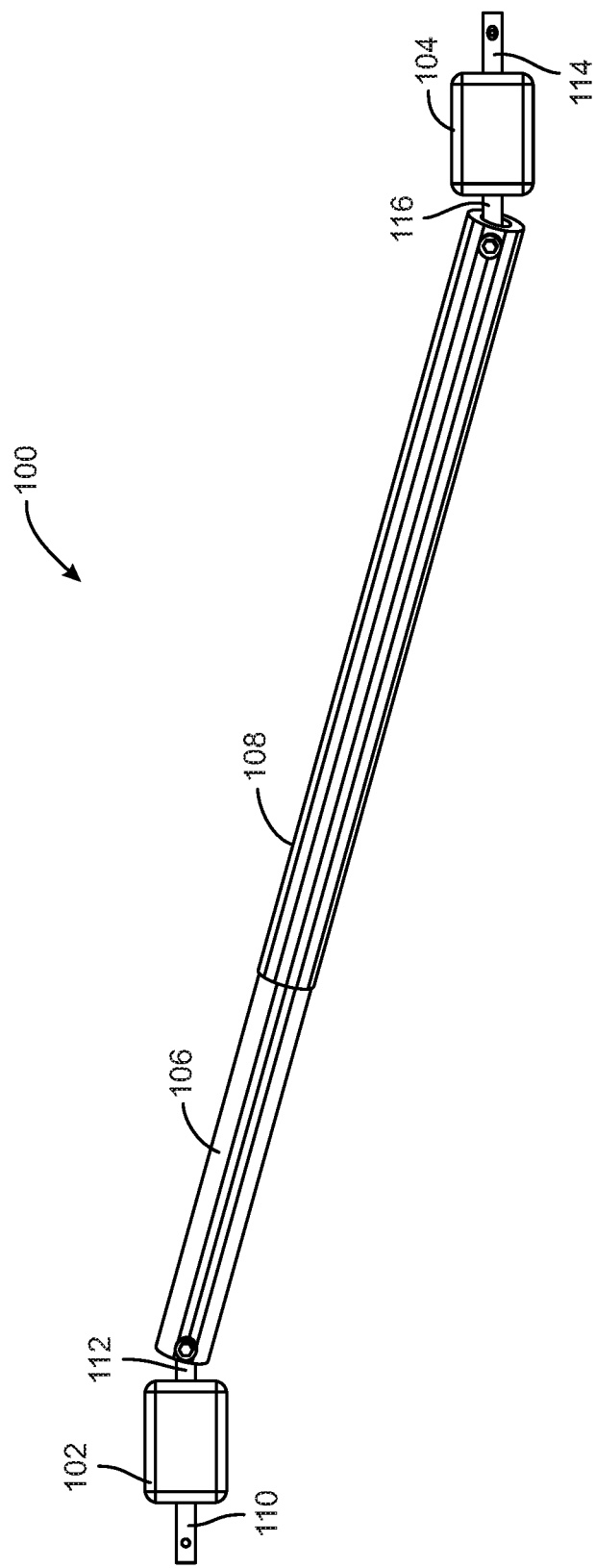
FIG. 2 is a top view of the drive shaft assembly.
Figure 3:
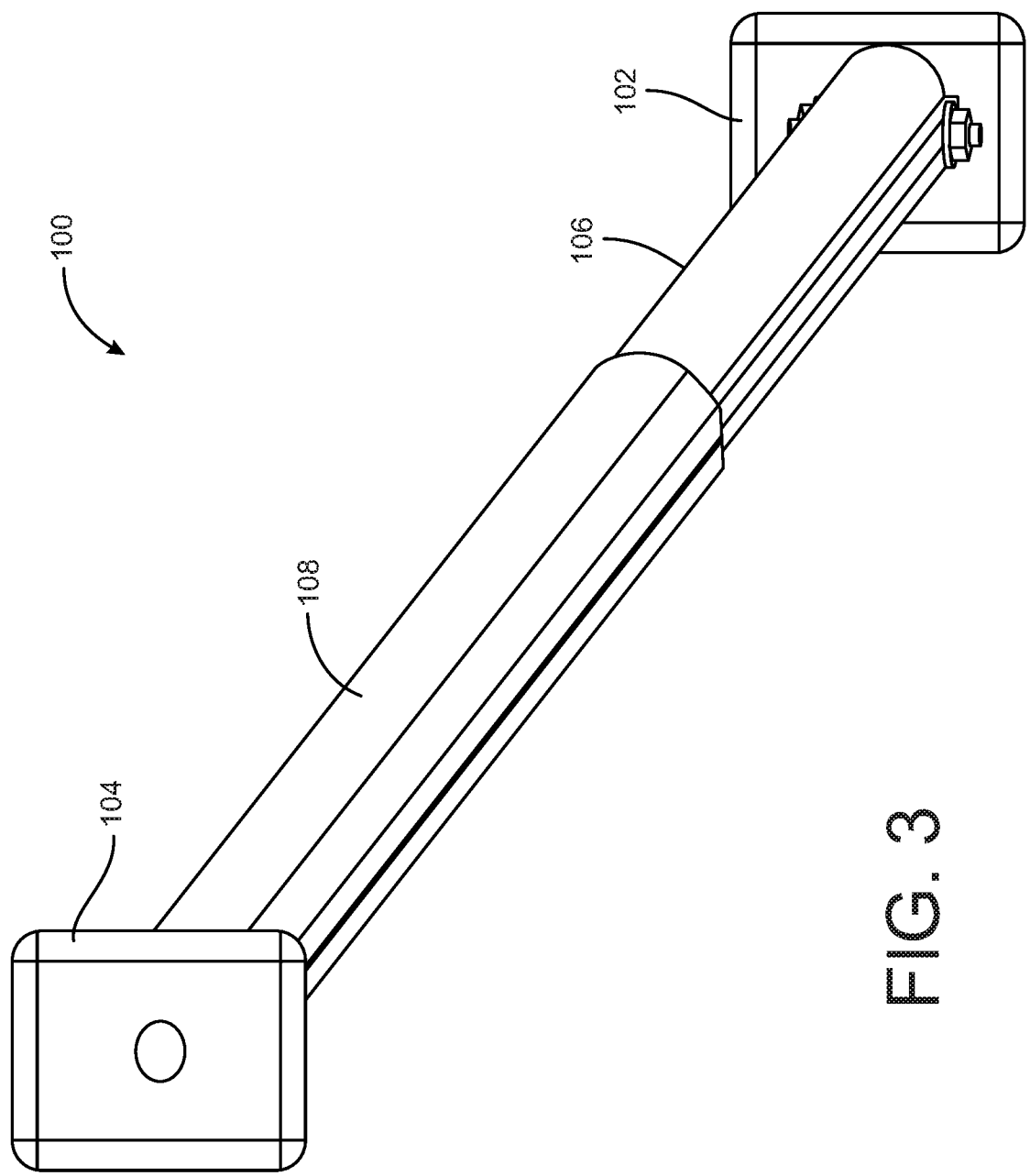
FIG. 3 is a perspective view of an underside of the drive shaft assembly.
Figure 4:
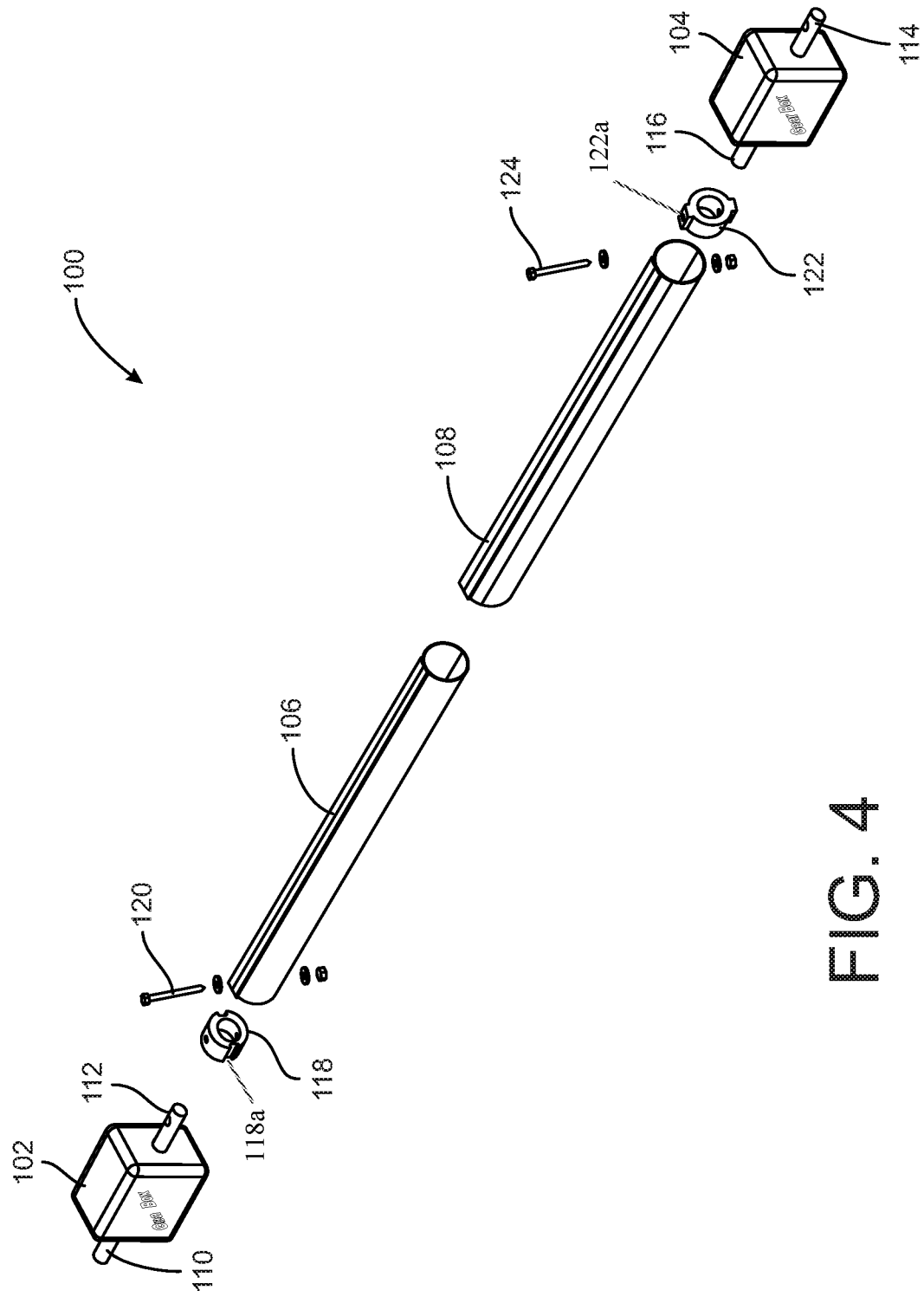
FIG. 4 is an exploded perspective view of the drive shaft assembly.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

FIGS. 1 through 4 show a drive shaft assembly 100 according to one embodiment of the present disclosure. The drive shaft assembly 100 includes a pair of gearboxes 102 and 104, and a pair of drive shaft sections 106 and 108. The gearbox 102 has an input shaft 110 and an output shaft 112, while the gearbox 104 has an input shaft 114 and an output shaft 116. As shown, the gearboxes 102 and 104 can be offset from each other in any of the x-, y- or z-axes.

Figure 5:
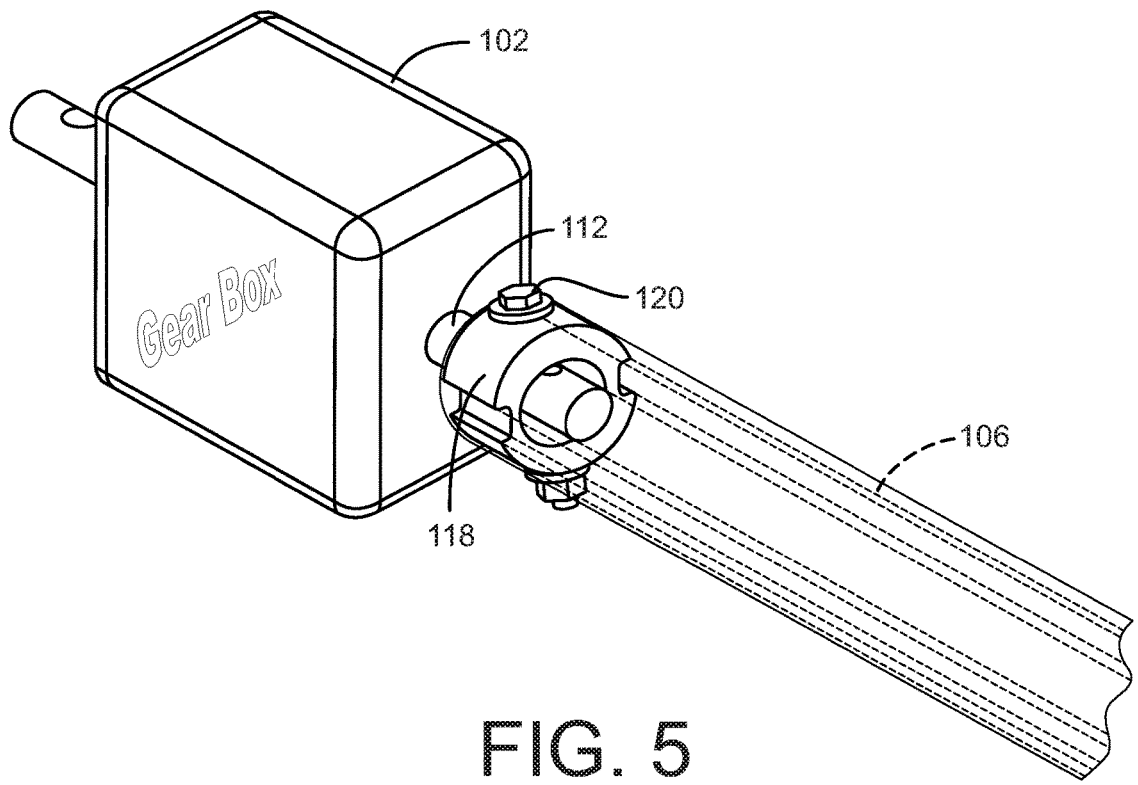
FIG. 5 is a perspective view of a gearbox and an adapter assembly of the drive shaft assembly.
Figure 6:
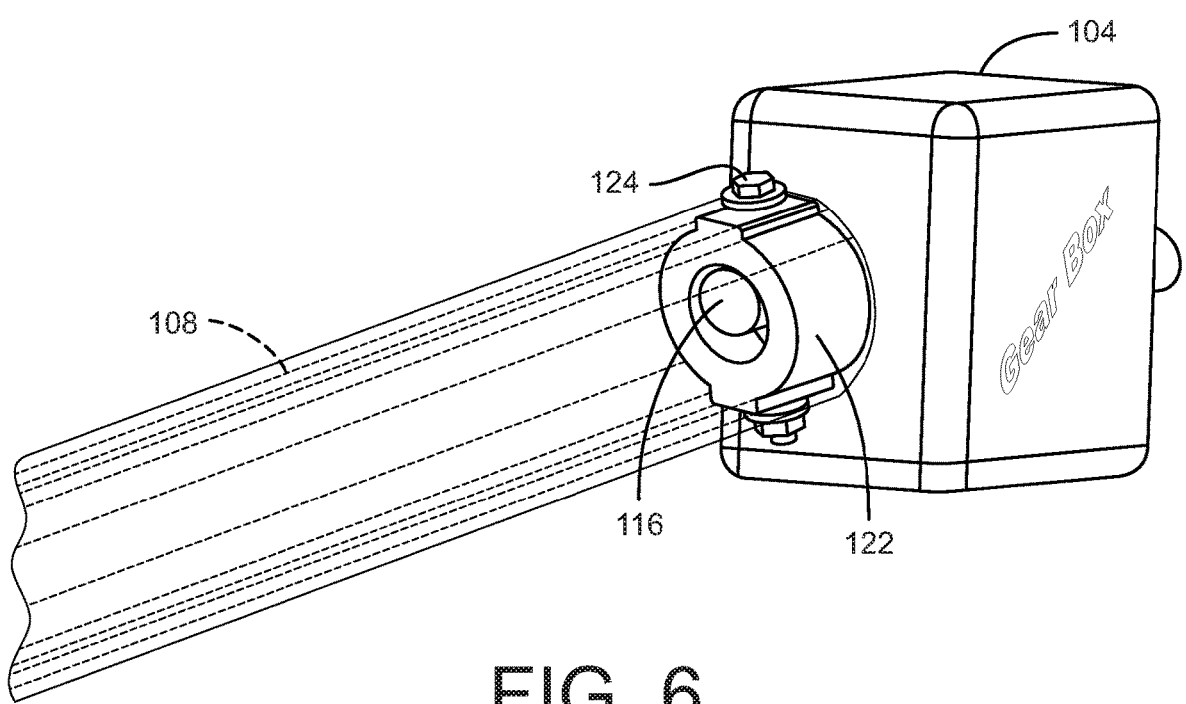
FIG. 6 is a perspective view of another gearbox and another adapter assembly.

FIG. 5 shows the gearbox 102 and the drive shaft section 106. The output shaft 112 is connected to the drive shaft section 106 by an adapter 118 and a bolt 120. As shown in FIG. 6, the output shaft 116 similarly is connected to the drive shaft section 108 by an adapter 122 and a bolt 124. The drive shaft section 106 has an outer profile that slidingly engages the inner profile of the other drive shaft section 108, preferably through the use of corresponding splines, keyways and/or grooves.

In this way, the drive shaft sections may telescopically translate relative to each other. This may be useful to accommodate differing distances between the gearboxes 102 and 104, to accommodate manufacturing tolerances in the lengths of the drive shaft sections, to allow for expansion and contraction due to temperature, or for some combination of these and other factors. In one embodiment, the drive shaft sections 106 and 108 may be extruded from aluminum.

The inner profiles of the drive shaft sections may also be different. In that case, the outer profile of the adapter 118 may differ from the outer profile of the adapter 122, with the outer profiles of the adapters corresponding to the inner profiles of the respective drive shaft sections. For example, the adapter 118 may have opposing indentations 118a spaced ninety degrees away from the hole through which the bolt 120 extends, while the adapter 122 may have opposed protrusions 122a through which the bolt 124 extends.

Figure 7:
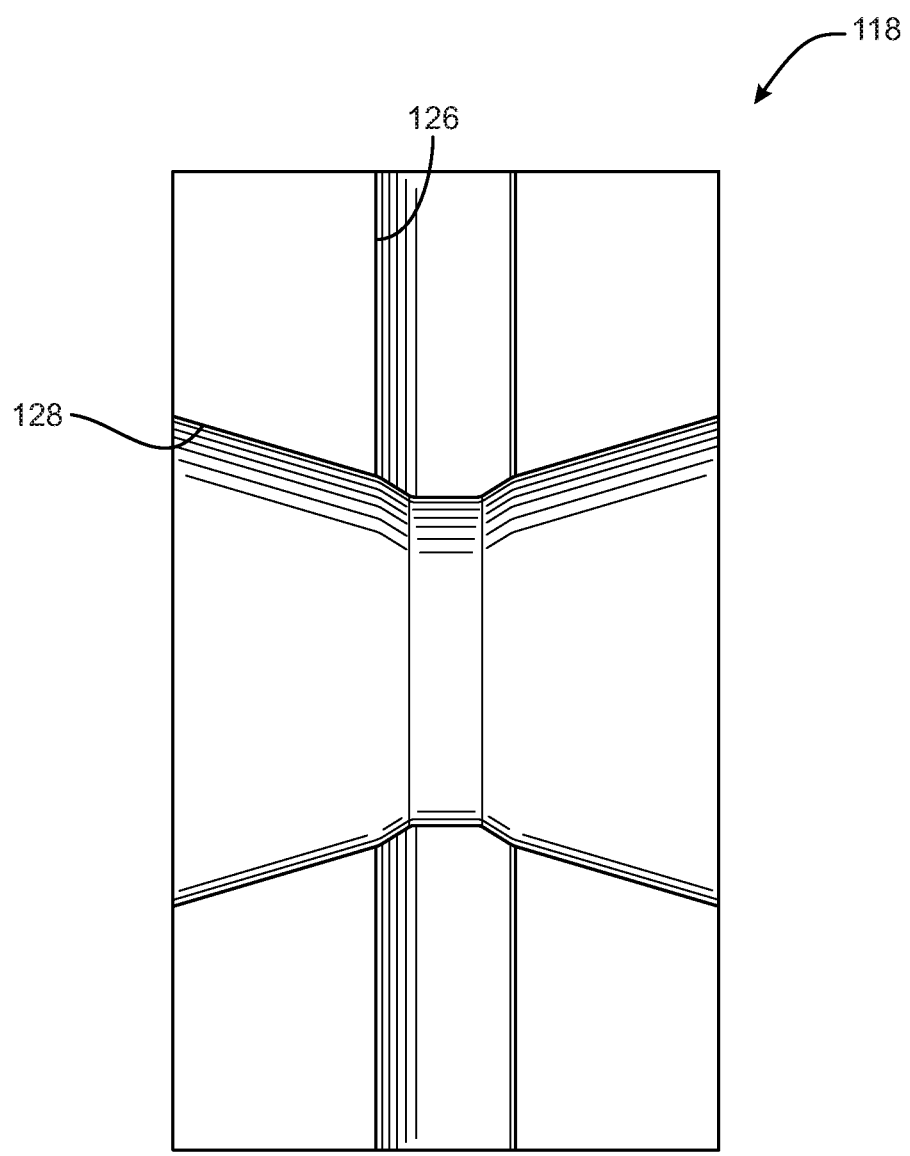
FIG. 7 is a cross-sectional view of an adapter of the adapter assembly.
Figure 8:
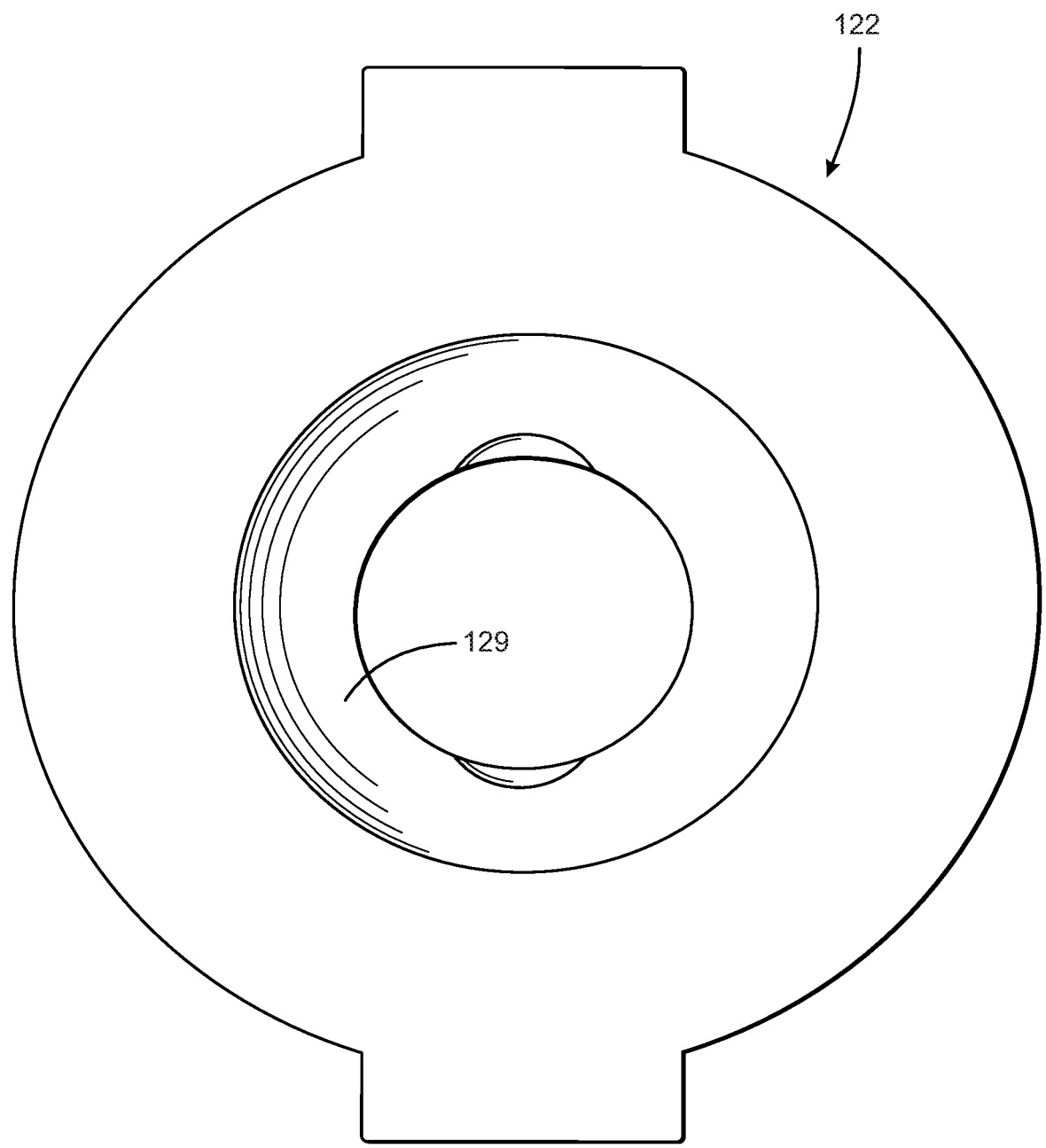
FIG. 8 is a front view of another embodiment of the adapter.
Figure 9:
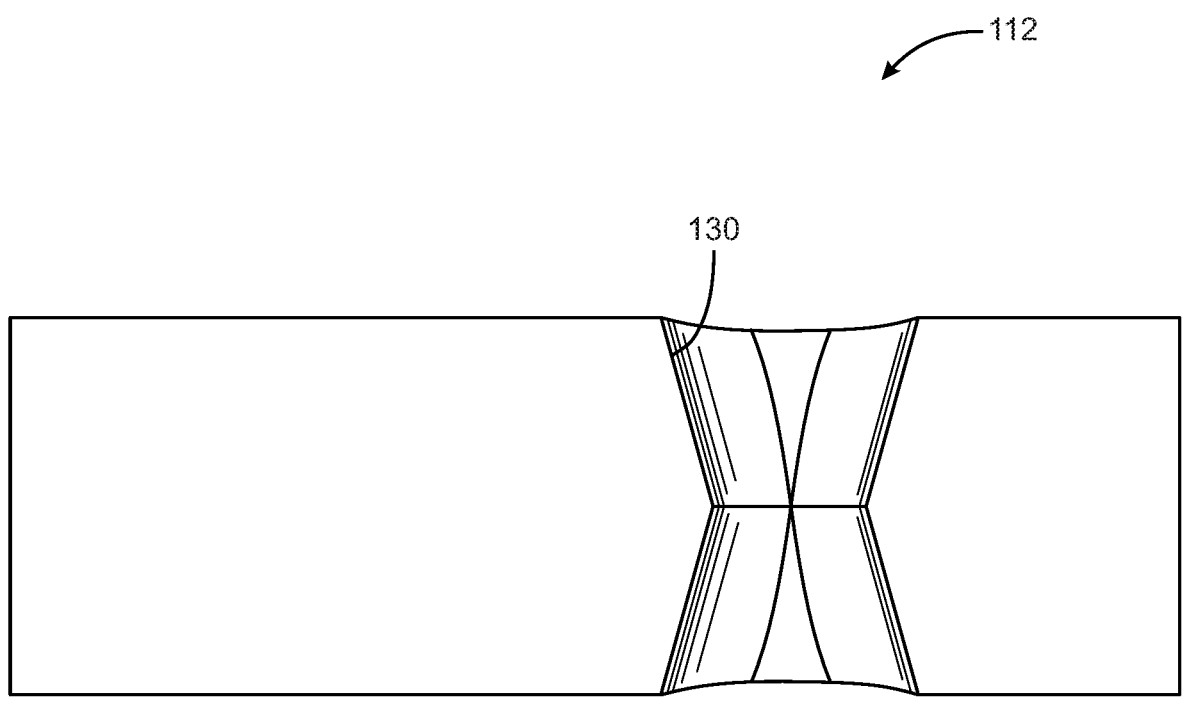
FIG. 9 is a cross-sectional view of a gearbox output shaft of the adapter assembly.
Figure 10:
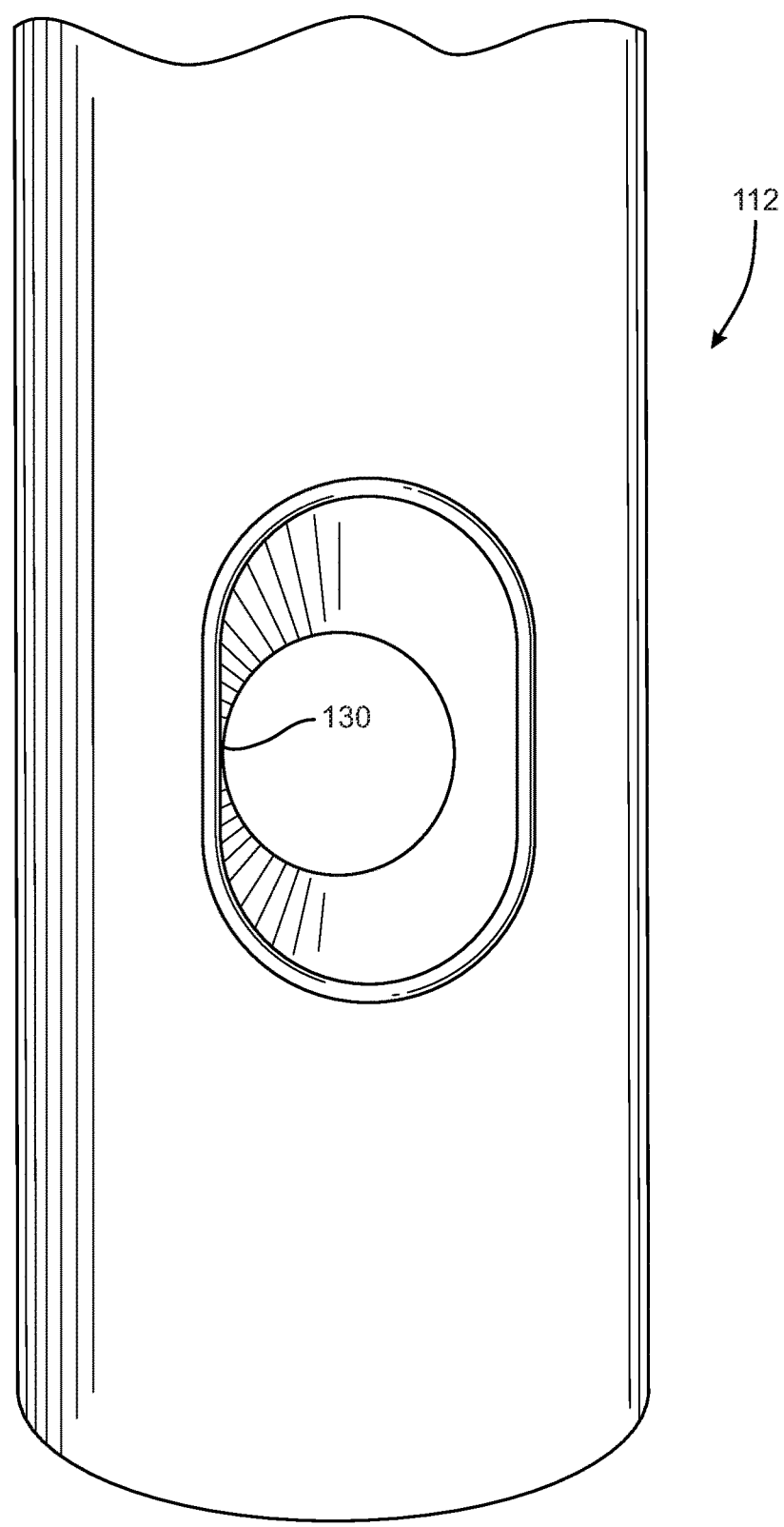
FIG. 10 is a top view of a portion of the gearbox output shaft.
Figure 11:
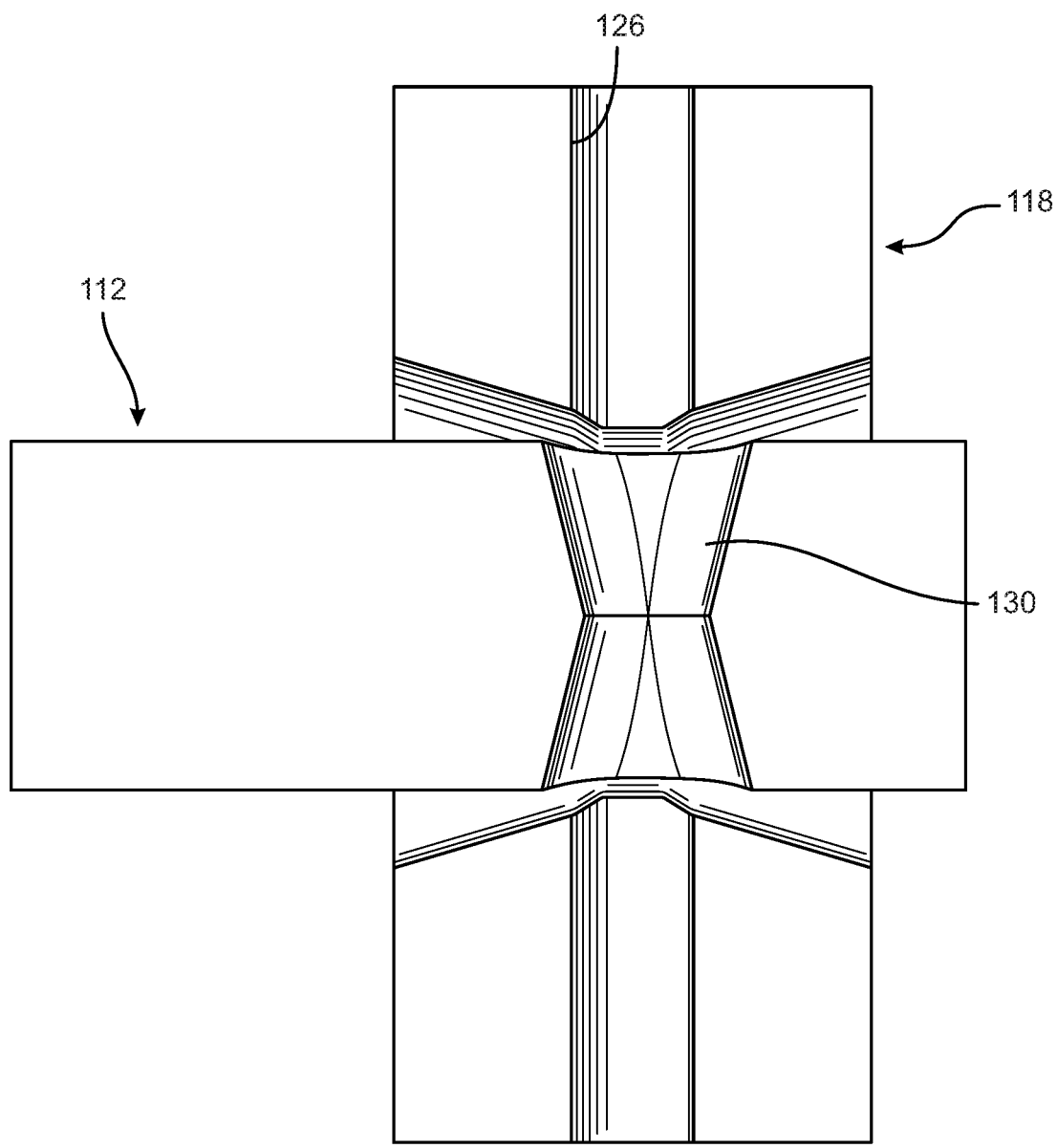
FIG. 11 is a cross-sectional view of the adapter and the gearbox output shaft.
Figure 12:
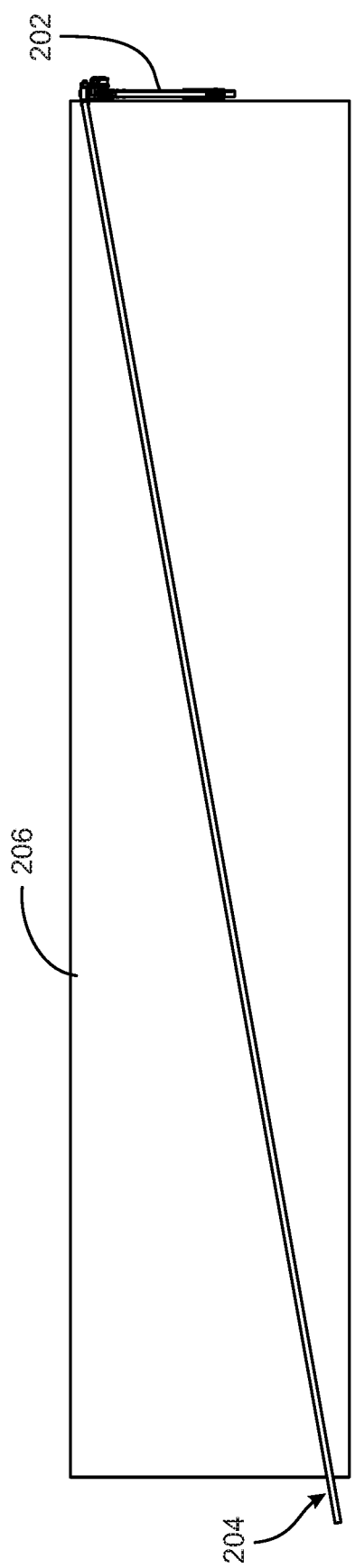
FIG. 12 is a top view of a trailer having a wobble joint assembly.
Figure 13:
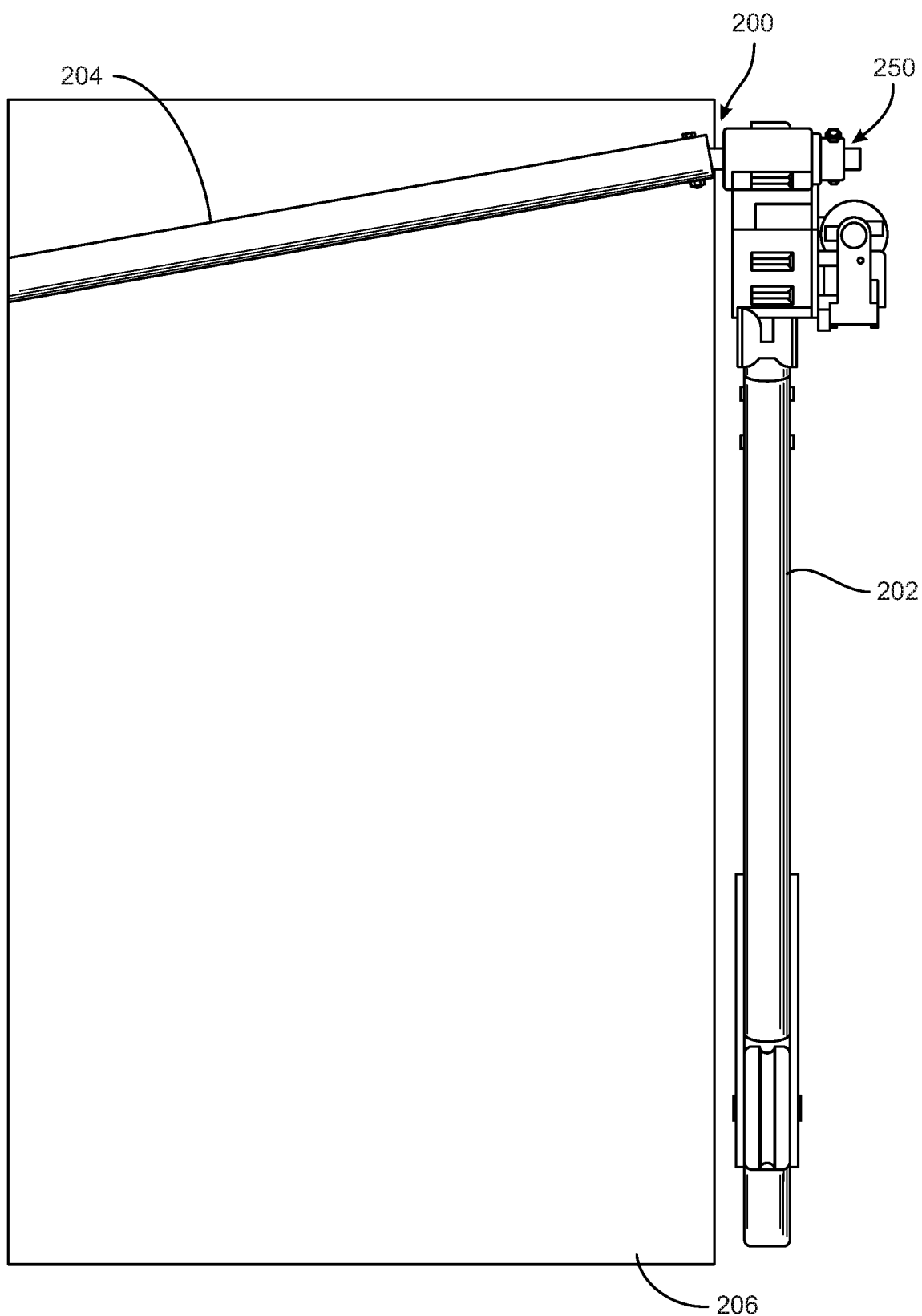
FIG. 13 is an enlarged view of the wobble joint assembly.
Figure 14:
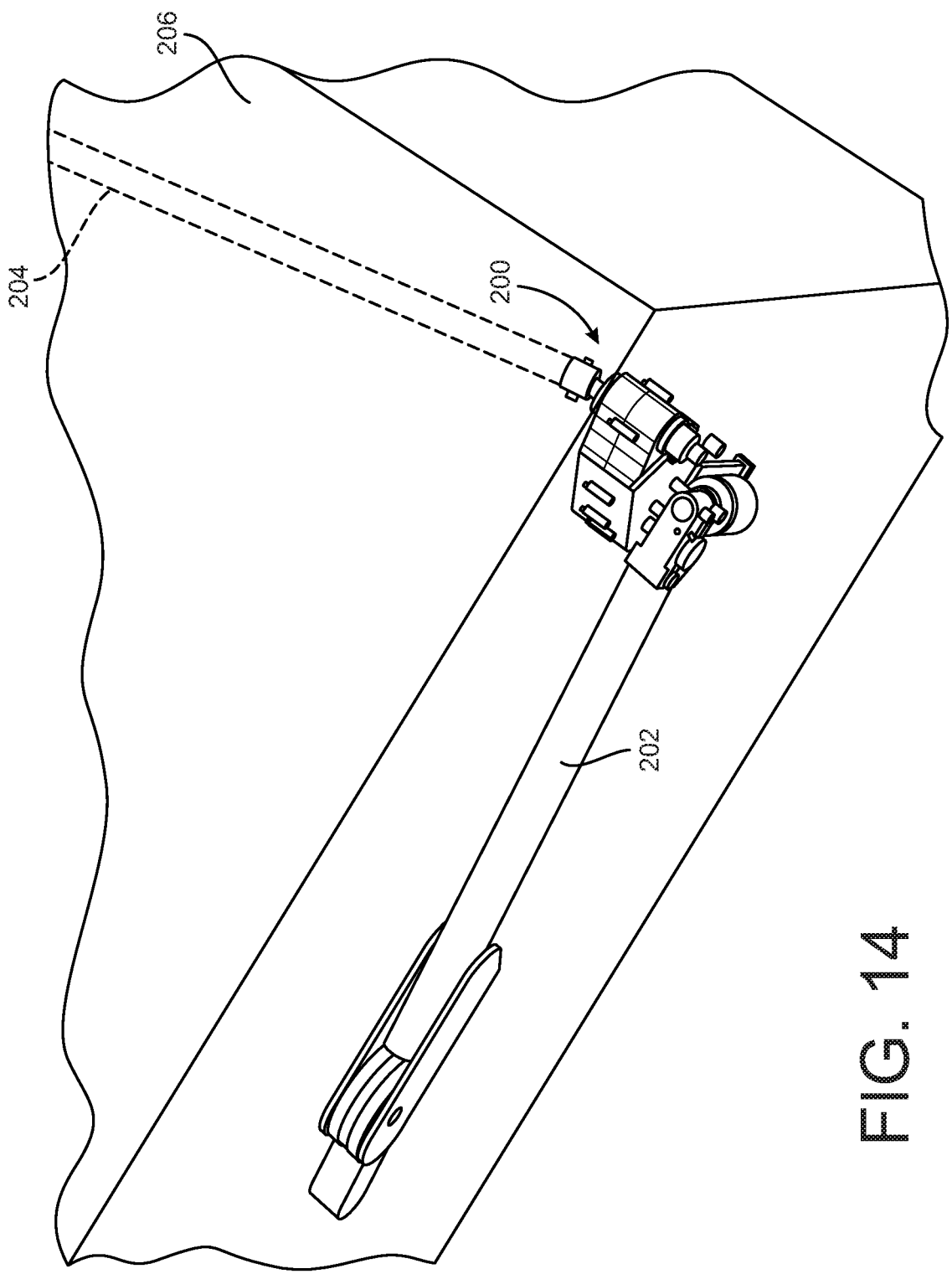
FIG. 14 is a perspective view of the wobble joint assembly.
Figure 15:
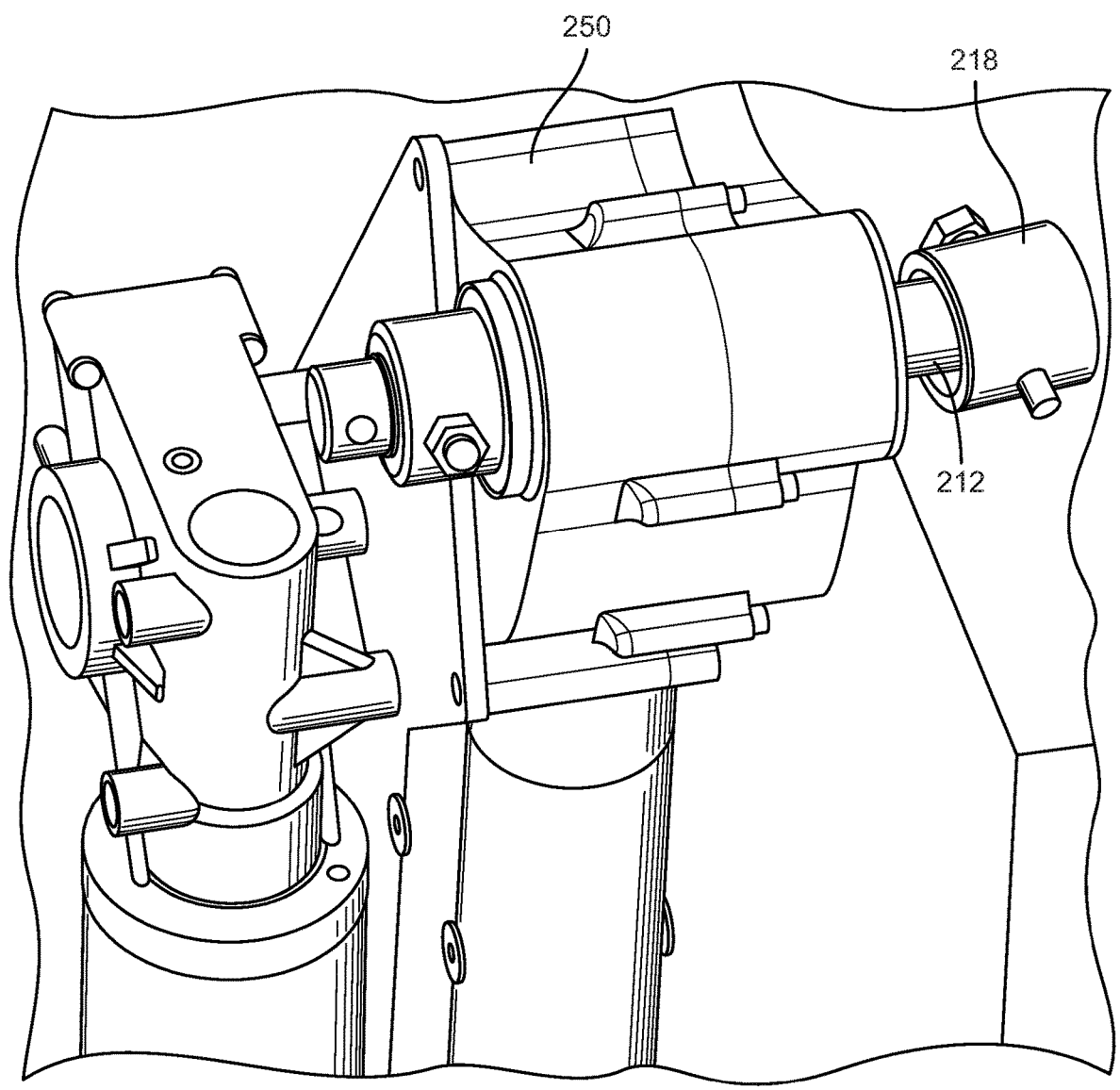
FIG. 15 is another perspective view of the wobble joint assembly.

FIG. 7 shows the adapter 118 including the hole 126 through which the bolt 120 extends, and a beveled central bore 128. FIG. 8 shows the adapter 122 including a beveled central bore 129. FIGS. 9 and 10 show the gearbox output shaft 112 including a beveled transverse bore 130 through which the bolt 120 also extends. FIG. 11 shows the relative disposition of the adapter 118 and the gearbox output shaft 112 in an operational state. This arrangement allows rotational torque to be applied directly from the gearbox output shafts through the bolts, the adapters 118 and 122, and finally to the respective drive shaft sections 106 and 108. In one embodiment, the gearbox output shafts rotate at about thirty revolutions per minute and produce about two hundred fifty foot-pounds of torque while the bolts can sustain about five hundred foot-pounds of torque before failing.

At the same time, the adapters 118 and 122 and their associated drive shaft sections may articulate with respect to the gearbox output shafts. In one embodiment, this articulation is on the order of about fifteen degrees to either side of the axis defined by the particular gearbox output shaft, so that the total angle of flexation is about thirty degrees. The drive shaft sections 106 and 108 may be adapted to drive various things, directly or indirectly, such as solar panels.

FIGS. 12-15 show a wobble joint assembly 200 mounted between a front arm 202 and a top arm 204 on a trailer 206. The wobble joint assembly includes an adaptor 218 mounted on an output shaft 212 of a motor 250. A similar motor and wobble joint (not shown) can be mounted on the opposite end of the top arm 204, such that the motors can apply torque to the top arm to extend or retract a cover wound thereon.

In some circumstances one end of the top arm 204 may get hung up such that the wobble joints do not remain generally opposed. In that situation, the flexibility of the joint minimizes the forces that otherwise might build up on components of the motors 250.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

What is claimed is:

1. A drive shaft assembly comprising:
   a first gearbox and a second gearbox, each gearbox having an output shaft;
   a first adapter connected to the output shaft of the first gearbox;
   a second adapter connected to the output shaft of the second gearbox;
   a first drive shaft connected to the first adapter; and
   a second drive shaft connected to the second adapter;
   wherein said first adapter includes a beveled central bore with the output shaft of the first gearbox received therein so that each drive shaft may articulate during rotation with respect to an axis defined by its associated output shaft through an angle of at least twenty degrees; and
   wherein the first drive shaft telescopically engages the second drive shaft.

2. The drive shaft assembly of claim 1 wherein the second drive shaft engages the first drive shaft through the use of corresponding splines.

3. The drive shaft assembly of claim 1 wherein the first drive shaft has an inner profile different than the inner profile of the second drive shaft.

4. The drive shaft assembly of claim 1, wherein an outer profile of the first adapter differs from an outer profile of the second adapter.

5. The drive shaft assembly of claim 4 wherein the first adapter has opposing indentations spaced ninety degrees away from a through hole intersecting said beveled central bore.

6. The drive shaft assembly of claim 4 wherein the second adapter has opposed protrusions through which a hole extends.

7. The drive shaft assembly of claim 1 wherein the second adapter includes a beveled central bore with the output shaft of the second gearbox received therein.

8. The drive shaft assembly of claim 1 wherein:
   the first output shaft includes a beveled transverse bore;
   said first adapter includes a through hole intersecting said beveled central bore; and
   said drive shaft assembly includes a bolt extending through said through hole of said first adapter and said beveled transverse bore of said first output shaft.

9. A drive shaft assembly comprising:
   a first gearbox having a first output shaft;
   a second gearbox having a second output, wherein the first gearbox is offset from the second gearbox in at least one of x-, y- or z-axes;
   a first drive shaft connected to the first output shaft; and
   a second drive shaft connected to the second output shaft, the second drive shaft having an inner profile that telescopically engages an outer profile of the first drive through the use of splines;
   a first adapter connected to the first output shaft; and
   a second adapter connected to the second output shaft,
   wherein an outer profile of the first adapter differs from an outer profile of the second adapter, and
   wherein the first drive shaft has an inner profile different than the inner profile of the second drive shaft.

10. The drive shaft assembly of claim 9 wherein the first adapter has opposing indentations spaced ninety degrees away from a through hole.

11. The drive shaft assembly of claim 9 wherein the second adapter has opposed protrusions through which a hole extends.

12. The drive shaft assembly of claim 9 wherein the first adapter includes a beveled central bore.

13. The drive shaft assembly of claim 9 wherein the second adapter includes a beveled central bore.

14. The drive shaft assembly of claim 9 wherein the first output shaft includes a beveled central bore.

15. The drive shaft assembly of claim 9 wherein each drive shaft may articulate with respect to its associated output shaft.

* * * * *